United States Patent
Surnilla et al.

(10) Patent No.: US 9,932,938 B2
(45) Date of Patent: *Apr. 3, 2018

(54) METHODS AND SYSTEMS FOR DIAGNOSING AN INTAKE OXYGEN SENSOR BASED ON PRESSURE

(71) Applicant: Ford Global Technologies, LLC, Dearborn, MI (US)

(72) Inventors: Gopichandra Surnilla, West Bloomfield, MI (US); Yong-Wha Kim, Ann Arbor, MI (US); Michael James Uhrich, West Bloomfield, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/360,849

(22) Filed: Nov. 23, 2016

(65) Prior Publication Data
US 2017/0074215 A1 Mar. 16, 2017

Related U.S. Application Data (63) Continuation of application No. 14/573,060, filed on Dec. 17, 2014, now Pat. No. 9,528,476.

(51) Int. Cl.
*B60T 7/12* (2006.01)
*F02M 26/46* (2016.01)
(Continued)

(52) U.S. Cl.
CPC .............. *F02M 26/46* (2016.02); *F02B 37/00* (2013.01); *F02D 41/0072* (2013.01); *F02D 41/144* (2013.01); *F02D 41/1454* (2013.01); *F02D 41/1495* (2013.01); *F02D 41/222* (2013.01); *F02M 26/04* (2016.02); *F02M 26/16* (2016.02); *F02M 26/21* (2016.02); *F02M 26/47* (2016.02); *F02M 26/52* (2016.02); *F02M 35/10222* (2013.01); *F02M 35/10373* (2013.01); *F02B 37/007* (2013.01); *F02B 37/16* (2013.01); *F02B 37/18* (2013.01); *F02D 41/1456* (2013.01); *F02D 2041/1431* (2013.01);
(Continued)

(58) Field of Classification Search
CPC ... F02D 19/0623; F02D 41/22; G01M 15/104
USPC ........ 701/101, 108, 109, 114, 115; 123/479, 123/690; 73/114.18, 114.37
See application file for complete search history.

(56) References Cited

U.S. PATENT DOCUMENTS

6,739,177 B2 5/2004 Sato et al.
6,742,379 B2 6/2004 Matsubara et al.
(Continued)

*Primary Examiner* — John Kwon
(74) *Attorney, Agent, or Firm* — Julia Voutyras; McCoy Russell LLP (57) ABSTRACT

Methods and systems are provided for diagnosing an intake oxygen sensor. In one example, a method may include indicating degradation of an intake oxygen sensor based on a first time constant of an output of the intake oxygen sensor and a second time constant of an output of a throttle inlet pressure sensor. The method may further include adjusting EGR flow based on the output of the intake oxygen sensor and the output of the throttle inlet pressure sensor when the intake oxygen sensor is not degraded.

20 Claims, 4 Drawing Sheets (51) Int. Cl.
*F02M 35/10* (2006.01)
*F02D 41/00* (2006.01)
*F02D 41/14* (2006.01)
*F02D 41/22* (2006.01)
*F02M 26/16* (2016.01)
*F02M 26/21* (2016.01)
*F02M 26/47* (2016.01)
*F02M 26/52* (2016.01)
*F02M 26/04* (2016.01)
*F02B 37/00* (2006.01)
*F02B 37/007* (2006.01)
*F02B 37/16* (2006.01)
*F02B 37/18* (2006.01)
*F02M 26/05* (2016.01)

(52) U.S. Cl.
CPC ............ *F02M 26/05* (2016.02); *Y02T 10/144* (2013.01); *Y02T 10/47* (2013.01)

(56) References Cited

U.S. PATENT DOCUMENTS

| | | | |
|---|---|---|---|
| 9,181,887 | B2 | 11/2015 | Surnilla et al. |
| 9,234,476 | B2 | 1/2016 | Hakeem et al. |
| 9,322,367 | B2 | 4/2016 | Vigild et al. |
| 9,376,968 | B2 | 6/2016 | Surnilla et al. |
| 9,416,740 | B2 | 8/2016 | Styles et al. |
| 9,441,564 | B2 | 9/2016 | Surnilla et al. |
| 9,528,476 | B2 * | 12/2016 | Surnilla ........... F02M 35/10373 |
| 2014/0238368 | A1 | 8/2014 | Jammoussi et al. |
| 2014/0345584 | A1 | 11/2014 | Jammoussi et al. |
| 2015/0114346 | A1 | 4/2015 | Surnilla et al. |
| 2016/0103095 | A1 | 4/2016 | Surnilla et al. |
| 2016/0139073 | A1 | 5/2016 | McQuillen et al. |
| 2016/0169138 | A1 | 6/2016 | McQuillen et al. |

* cited by examiner

METHODS AND SYSTEMS FOR DIAGNOSING AN INTAKE OXYGEN SENSOR BASED ON PRESSURE

CROSS REFERENCE TO RELATED APPLICATIONS

The present application is a continuation of U.S. patent application Ser. No. 14/573,060, entitled "METHODS AND SYSTEMS FOR DIAGNOSING AN INTAKE OXYGEN SENSOR BASED ON PRESSURE," filed on Dec. 17, 2014, the entire contents of which are incorporated herein by reference for all purposes.

FIELD

The present description relates generally to a gas constituent sensor included in an intake system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system may include various sensors to measure and/or control the EGR. As one example, the EGR system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. The EGR system may additionally or optionally include an exhaust gas oxygen sensor coupled to the exhaust manifold for estimating a combustion air-fuel ratio.

As one example, an intake pressure, such as throttle inlet pressure (TIP), may be used to adjust an output of an intake oxygen sensor (IAO2) in order to compensate for pressure fluctuations in the air intake system that may affect the IAO2 output. This compensation may be possible due to a direct correlation between the time-varying signals of the TIP sensor and IAO2 sensor. However, the inventors herein have recognized potential issues with this method. As one example, IAO2 sensor degradation resulting in a slow responding IAO2 sensor (e.g., an output having an altered time constant) may degrade the correlation between the TIP and IAO2 signals, thereby resulting in an inaccurately corrected IAO2 output. More specifically, as a time constant of the IAO2 signal varies relative to a time constant of the TIP signal, pressure correction of the IAO2 signal based on the TIP signal may have reduced accuracy. As a result, EGR estimates based on the corrected IAO2 signal may have reduced accuracy, thereby degrading EGR control and engine control based on EGR flow estimates.

In one example, the issues described above may be addressed by a method for indicating degradation of an intake oxygen sensor based on a first time constant of an output of the intake oxygen sensor and a second time constant of an output of a throttle inlet pressure sensor. In this way, a vehicle operator may be notified when replacement and/or repair of the oxygen sensor is necessary. Additionally, EGR control based on inaccurate EGR flow estimates from a degraded oxygen sensor may be avoided by using another method to determine EGR flow estimates when the intake oxygen sensor has become degraded.

For example, the oxygen sensor may be positioned in an intake passage of the engine, downstream of where an EGR passage couples to the intake passage. As such, the intake oxygen sensor may be used to estimate EGR flow based on an output of the intake oxygen sensor relative to a reference output determined when EGR was not flowing to the intake passage. A TIP sensor may be positioned in the intake passage downstream of and/or proximate to the oxygen sensor, but upstream of an intake throttle. As such, the TIP sensor may be used to estimate the TIP. During engine conditions such as when the engine is boosted, the TIP and oxygen concentration may fluctuate over the same time intervals. When the TIP fluctuates by more than a threshold amount, the amount of time it takes the TIP sensor to register the change in TIP may be estimated. A similar estimate may be made for the time it takes the oxygen sensor to register the change in oxygen concentration. Based on the delays of the two sensors, degradation of the oxygen sensor may be detected if the delay in the oxygen sensor is different than the delay of the TIP sensor by more than a threshold amount. By detecting oxygen sensor degradation, a vehicle operator may be notified when replacement of the oxygen sensor is necessary, and EGR estimates using the oxygen sensor may be avoided when the oxygen sensor is degraded.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
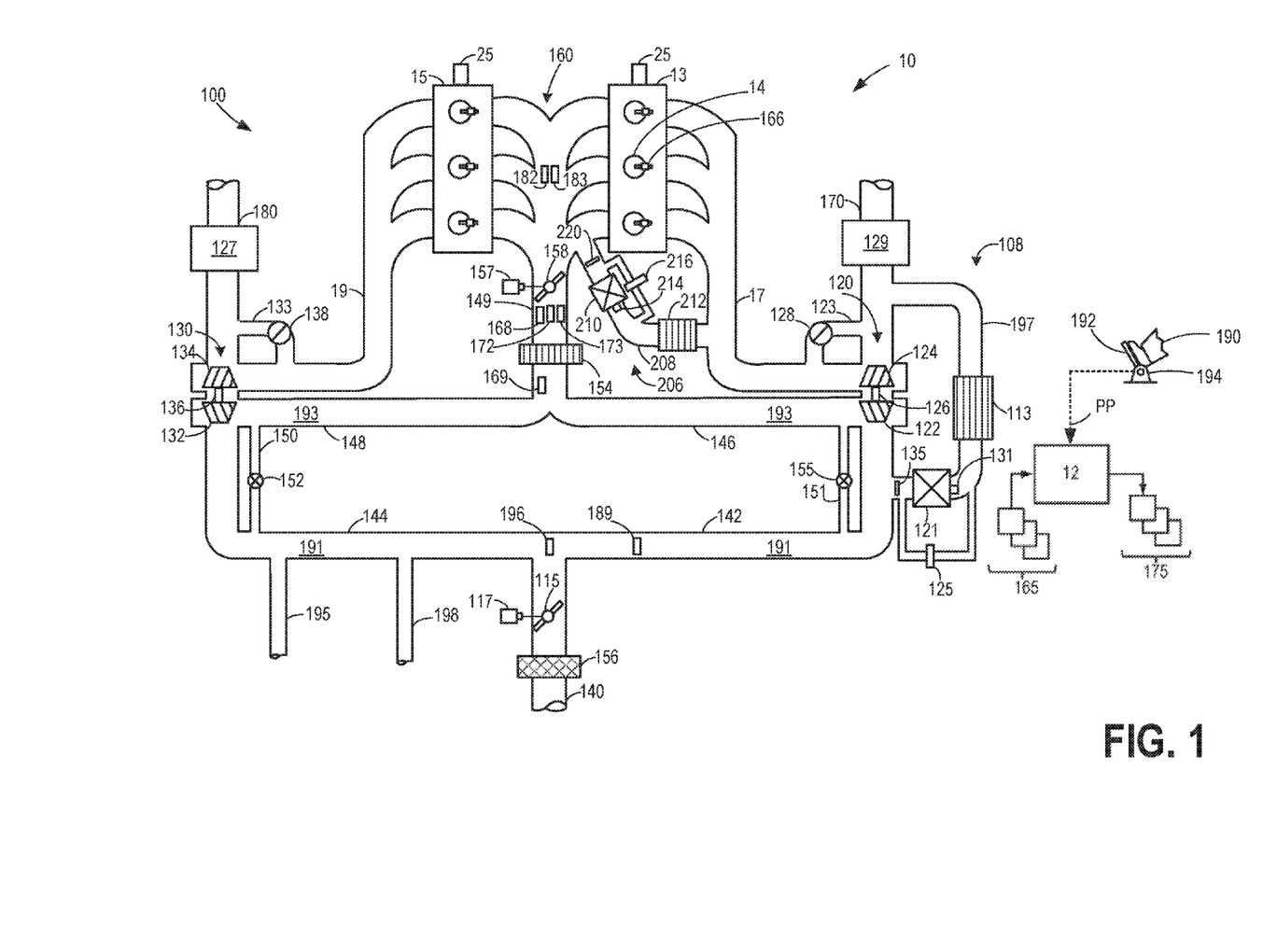
FIG. 1 is a schematic diagram of an engine system including an intake oxygen sensor.
Figure 3:
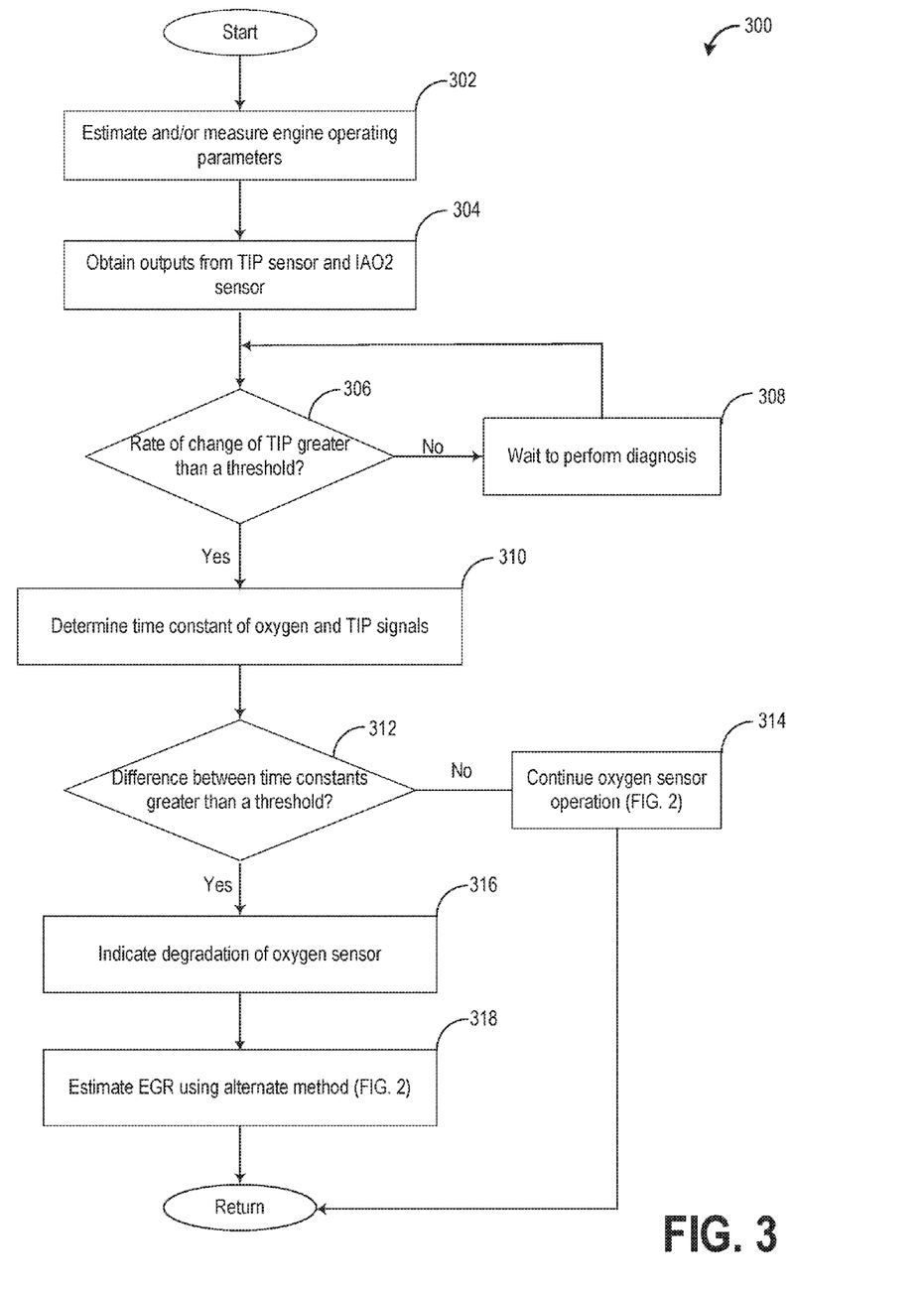
FIG. 3 shows a method for diagnosing degradation of an intake oxygen sensor.
Figure 4:
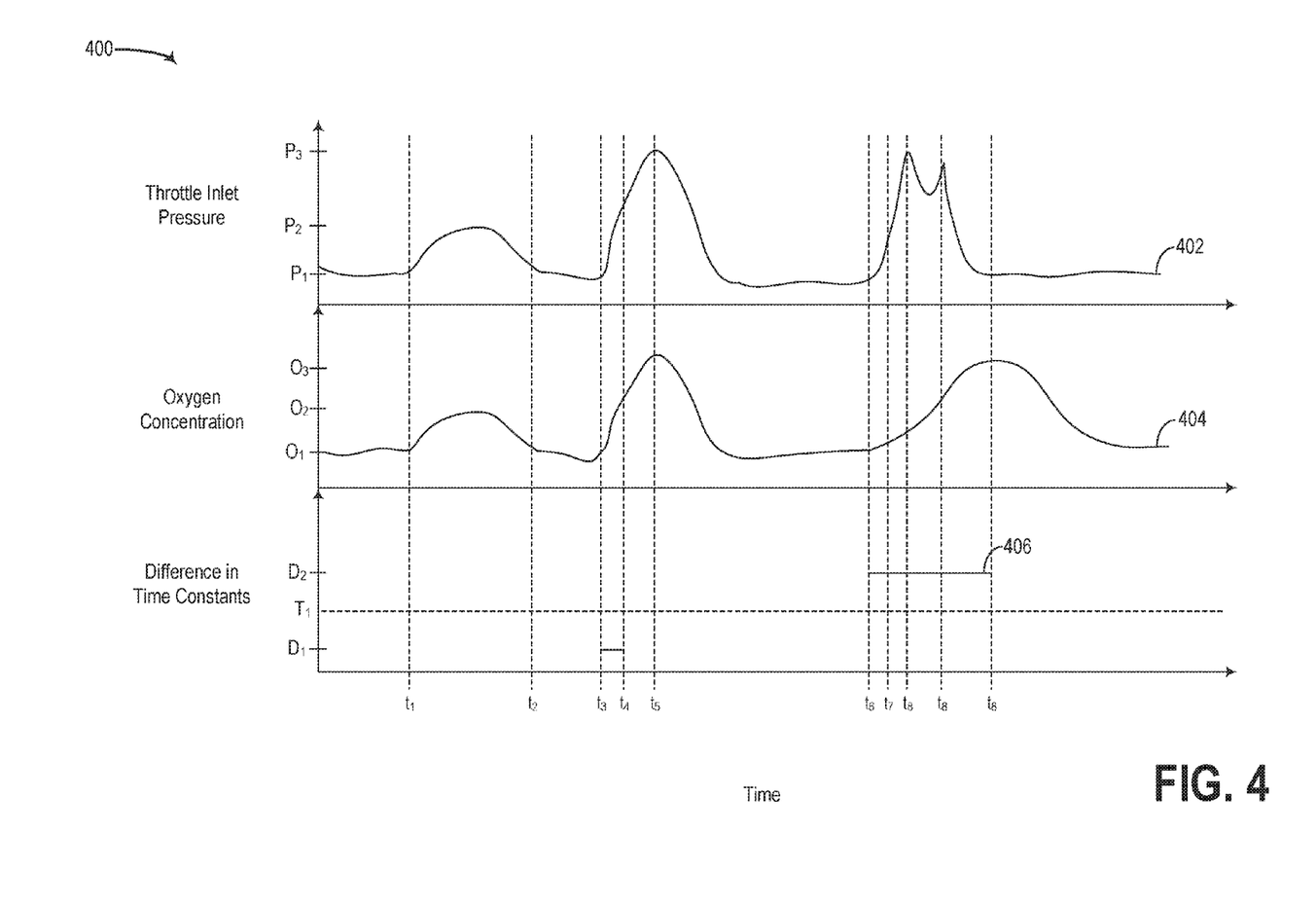
FIG. 4 shows a graph of fluctuations in throttle inlet pressure and oxygen concentration measured by an intake oxygen sensor.

The following description relates to system and methods for detecting oxygen sensor degradation. As shown in FIG. 1 a turbocharged engine may include an intake oxygen sensor located in an intake passage of the engine. Additionally the engine may include a throttle inlet pressure (TIP) sensor located downstream of and/or proximate to (e.g., next to) the oxygen sensor but upstream of an intake throttle. In another example, the TIP sensor may be coupled to an inlet of the intake throttle. The oxygen sensor may be used to estimate an EGR flow, as described in FIG. 2, during non-boosted conditions assuming that the oxygen sensor is not degraded. As shown in FIG. 4, oxygen concentration and TIP may fluctuate over time, and under some engine conditions, such as when the engine is boosted, the TIP and/or oxygen concentration may increase significantly. However, it may make take some amount of time for the sensors to register changes in the TIP and oxygen concentration. In other words, the sensors may have a delayed response to changes in oxygen concentration and TIP. This response time may be estimated as a time constant, or the amount of time it takes a sensor to register a proportion of the change in a measured variable. The amount of delay in the sensor measurements may be an indication of sensor degradation. FIG. 3 shows a method for determining when the oxygen sensor has become degraded. Specifically, oxygen sensor degradation may be detected if the time constant for the oxygen sensor differs from the time constant for the TIP sensor by more than a threshold amount.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-3.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), NOx traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. The LP EGR system may include a differential pressure over valve (DPOV) sensor 125. In one example, an EGR flow rate may be estimated based on the DPOV system which includes the DPOV sensor 125 that detects a pressure difference between an upstream region of the EGR valve 121 and a downstream region of EGR valve 121. EGR flow rate (e.g., LP EGR flow rate) determined by the DPOV system may be further based on an EGR temperature detected by an EGR temperature sensor 135 located downstream of EGR valve 121 and an area of EGR valve opening detected by an EGR valve lift sensor 131. In another example, EGR flow rate may be determined based on outputs from an EGR measurement system that includes an intake oxygen sensor 168, mass air flow sensor (not shown), manifold absolute pressure (MAP) sensor 182 and manifold temperature sensor 183. In some examples, both the EGR measurement systems (that is, the DPOV system including differential pressure sensor 125 and the EGR measurement system including intake oxygen sensor 168) may be used to determine, monitor and adjust EGR flow rate.

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In the depicted example, the engine system 100 may also include a HP EGR system 206. HP EGR system 206 routes a desired portion of exhaust gas from common exhaust passage 17, upstream of the turbine 124, to intake manifold 160, downstream of intake throttle 158. Alternatively, the HP EGR system 206 may be positioned between exhaust passage 17 and the intake passage 193, downstream of the compressor 122 and upstream of the CAC 154. The amount of HP EGR provided to intake manifold 160 may be varied by the controller 12 via EGR valve 210 coupled in the HP EGR passage 208. In the example embodiment shown at FIG. 1, HP EGR system 206 includes an EGR cooler 212 positioned upstream of EGR valve 210. EGR cooler 212 may reject heat from the recirculated exhaust gas to engine coolant, for example. The HP EGR system 206 includes a differential pressure over valve (DPOV) sensor 216. In one example, an EGR flow rate (e.g., HP EGR flow rate) may be estimated based on the DPOV system which includes the DPOV sensor 216 that detects a pressure difference between an upstream region of EGR valve 210 and a downstream region of EGR valve 210. EGR flow rate determined by the DPOV system may be further based on an EGR temperature detected by an EGR temperature sensor 220 located downstream of EGR valve 210 and an area of EGR valve opening detected by an EGR valve lift sensor 214. In alternate embodiments, the HP EGR passage 208 may not include a DPOV system.

Likewise, the engine may include a second high-pressure EGR loop (not shown) for recirculating at least some exhaust gas from the exhaust passage 19, upstream of the turbine 134, to the intake passage 148, downstream of the compressor 132, or to the intake manifold 160, downstream of intake throttle 158. EGR flow through HP-EGR loops 208 may be controlled via HP-EGR valve 210.

EGR valve 121 and EGR valve 210 may be configured to adjust an amount and/or rate of exhaust gas diverted through the corresponding EGR passages to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valves, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting one or more of the EGR valves 121 and 210 and/or the AIS throttle 115 may adjust and EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 168 is positioned upstream of throttle 158 and downstream of CAC 154. However, in other embodiments, intake oxygen sensor 168 may be arranged at another location along intake passage 149, such as upstream of the CAC 154. Intake oxygen sensor (IAO2) 168 may be any suitable sensor for providing an indication of the oxygen concentration of the intake charge air (e.g., air flowing through the common intake passage 149), such as a linear oxygen sensor, intake UEGO (universal or wide-range exhaust gas oxygen) sensor, two-state oxygen sensor, etc. In one example, the intake oxygen sensors 168 may be an intake oxygen sensor including a heated element as the measuring element. During operation, a pumping current of the intake oxygen sensor may be indicative of an amount of oxygen in the gas flow.

A pressure sensor 172 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 172 is a TIP sensor. In alternate examples, the reference intake pressure is a manifold pressure (MAP) as sensed by MAP sensor 182. A time constant for the signal output by the pressure sensor 172 may be obtained when the TIP fluctuates by more than a threshold amount, as will be described in greater detail in FIG. 3. The time constant may be based on the amount of time it takes the pressure sensor 172 to register a portion of the total fluctuation in the TIP.

Engine system 100 may include various sensors 165, in addition to those mentioned above. As shown in FIG. 1, common intake passage 149 may include a throttle inlet temperature sensor 173 for estimating a throttle air temperature (TCT). Further, while not depicted herein, each of intake passages 142 and 144 may include a mass air flow sensor or alternatively the mass air flow sensor can be located in common duct 140.

Humidity sensor 189 may be included in only one of the parallel intake passages. As shown in FIG. 1, the humidity sensor 189 is positioned in the intake passage 142 (e.g., non PCV and non-purge bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). Humidity sensor 189 may be configured to estimate a relative humidity of the intake air. In one embodiment, humidity sensor 189 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor.

Intake oxygen sensor 168 may be used for estimating an intake oxygen concentration and inferring an amount of EGR flow through the engine based on a change in the intake oxygen concentration upon opening of the EGR valve 121. Specifically, a change in the output of the sensor upon opening the EGR valve 121 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed. A zero point estimation of the intake oxygen sensor 168 may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

As will be explained in greater detail in FIG. 3, a time constant of the signal output by the oxygen sensor (IAO2) may be obtained and then compared to a time constant of the TIP sensor signal when the TIP changes by more than a threshold amount. The time constant may be a measure of the time it takes for the oxygen sensor to register a portion of a total fluctuation in the oxygen concentration of the intake air. More specifically, the TIP sensor signal and the IAO2 sensor signal may be a time-varying step response to a changing step input signal (e.g., the intake pressure and intake oxygen content). As such, the time constant of each of these signals may represent the time it takes for the sensor's step response to reach approximately 63% of its final (e.g., asymptotic) value.

The controller may further contain computer readable instructions for detecting when the oxygen sensor has become degraded based on a difference between the time constant of the oxygen sensor 168 and the time constant of the pressure sensor 172, as will be explained in greater detail in FIG. 3. Further, the controller may contain computer readable instructions for not using the oxygen sensor to make EGR flow estimates (or not adjust the EGR valve based on the oxygen sensor EGR estimates) when it has been determined that the oxygen sensor is degraded.

In this way, the system of FIG. 1 provides for a system comprising an air intake system of an engine including an intake throttle, a throttle inlet pressure sensor disposed in the air intake system upstream of the intake throttle, an intake oxygen sensor disposed in the air intake system upstream of the throttle inlet pressure sensor, and a controller with computer readable instructions for indicating degradation of the intake oxygen sensor in response to a difference between a first time constant of a signal output by the intake oxygen sensor and a second time constant of a signal output by the throttle inlet pressure sensor being greater than a threshold difference when the signal of the throttle inlet pressure is fluctuating by a threshold amount. In another example, the intake oxygen sensor may be disposed next to (e.g., proximate to) the throttle inlet pressure sensor. In yet another embodiment, the throttle inlet pressure sensor is disposed in the engine air intake system directly upstream of an intake throttle. The signal of the throttle inlet pressure may be fluctuating by the threshold amount when an average change in the signal of throttle inlet pressure is greater than the threshold amount over a duration. The system further comprises an exhaust gas recirculation (EGR) passage coupled between an exhaust passage and an intake passage of the air intake system upstream of the intake oxygen sensor, the EGR passage including an EGR valve with a differential pressure over valve (DPOV) sensor. The computer readable instructions may further include instructions for adjusting a positon of the EGR valve based on an output of the DPOV sensor and not the intake oxygen sensor in response to indicating degradation of the intake oxygen sensor. Indicating degradation includes one or more of alerting a vehicle operator that sensor is degraded and setting a diagnostic code.

Figure 2:
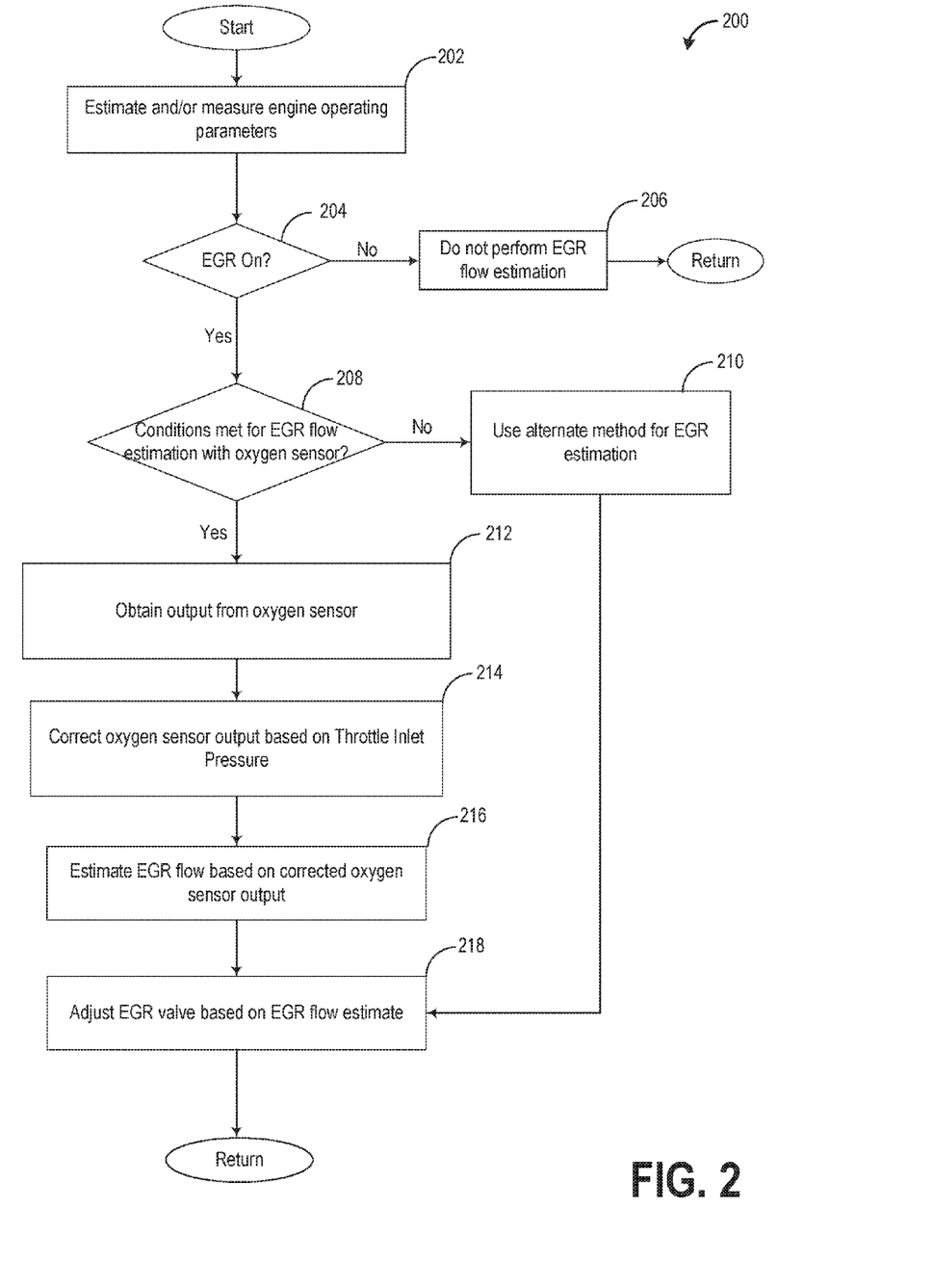
FIG. 2 shows a method for estimating EGR flow.

FIG. 2 shows a flow chart of a method 200 for estimating EGR flow in a low-pressure EGR system using an intake oxygen sensor (e.g., IAO2 168 shown in FIG. 1) and a throttle inlet pressure (TIP) sensor (e.g., pressure sensor 172 shown in FIG. 1). Instructions for carrying out method 200 may be stored in a memory of an engine controller such as controller 12 shown in FIG. 1. Further, method 200 may be executed by the controller. The controller may estimate the EGR mass flow rate using the intake oxygen sensor by estimating a change in the output of the oxygen sensor from a reference point when no EGR was flowing, as described above. However, the intake pressure may affect the output of the oxygen sensor independently of the EGR flow. Thus, for a given EGR flow rate, changes in the intake pressure may result in changes in the output of the oxygen sensor. A pressure correction factor is learned to compensate for the effect of intake pressure on the output of the intake oxygen sensor. The pressure correction factor is based on the change in pressure from a reference pressure at which the reference oxygen content measurement was taken.

Method 200 begins at 202 and the controller (e.g. controller 12) estimates and/or measures engine operating conditions based on feedback from a plurality of sensors (e.g. sensors 165). Engine operating conditions may include: engine temperature, engine speed and load, intake mass air flow, manifold pressure, a position of the EGR valve (e.g. EGR valve 121).

Method 200 proceeds to 204 and the controller determines if EGR is on, based on feedback from a position sensor (e.g., EGR valve lift sensor 131) about the position of the EGR valve. In another example, the controller may determine that EGR is on based on an EGR flow being greater than zero. In this way, the EGR flow may be on if EGR is flowing through the lower-pressure EGR passage (e.g., EGR passage 197 shown in FIG. 1) from the exhaust passage to the intake passage. If the controller determines that the EGR valve is closed and EGR is off, then method 200 continues to 206 and the controller does not perform EGR flow estimation and the method returns.

However, if at 204 the controller determines that EGR is on, then the controller proceeds to 208 to determine if proper conditions are met for EGR flow estimation with the intake oxygen sensor (e.g., IAO2 168 shown in FIG. 1) where the proper conditions may include when boost is disabled, intake air pressure is below a threshold, etc. For example, the controller may determine if estimating EGR flow with the intake oxygen sensor may produce a relatively accurate estimate based on engine operating conditions. Additionally, at 208, the controller may determine if the oxygen sensor is degraded. Specifically, the controller may determine that the oxygen sensor is degraded if the time constant of the oxygen sensor is greater than the time constant of the TIP sensor by more than a threshold, as described in greater detail in the method of FIG. 3.

If the controller determines that the oxygen sensor is degraded, and/or if any one or more of the other proper conditions for estimating EGR flow with the intake oxygen sensor do not exist, then the controller may continue to 210 and use an alternate method for EGR estimation. In one example, a differential pressure over valve (DPOV) sensor coupled to the EGR valve may be used to estimate the EGR flow. The method may then continue to 218 to adjust the EGR valve (and thus adjust EGR flow) based on the EGR estimate.

If the controller determines that the proper conditions for estimating EGR flow with the intake oxygen sensor are met at 208, then method 200 continues to 212 and the controller obtains one or more outputs from the oxygen sensor. The outputs of the oxygen sensor may be in the form of a pumping current (Ip) generated when a reference voltage (Vs) applied to the sensor. After obtaining the one more outputs from the oxygen sensor, the controller may proceed to 214 and correct the oxygen sensor output(s) based on the throttle inlet pressure (TIP). The TIP may be directly related to the output from a TIP sensor (such as pressure sensor 172 from FIG. 1). For example, the TIP may be measured by the TIP sensor. While changes in TIP may not be related to actual changes in oxygen concentration of intake air, changes in the TIP may affect the oxygen concentration read by the oxygen sensor. Thus at 214, a pressure correction factor may be applied to the oxygen sensor output based on the TIP measured by the TIP sensor. The pressure correction factor may be applied to the oxygen sensor because the time-varying signal of the oxygen sensor is highly correlated to that of the of the TIP sensor. As explained above, the pressure correction factor may be based on changes in the outputs from both the oxygen sensor and the TIP sensor from a reference point taken when EGR was disabled. Thus, because the throttle inlet pressure may affect the outputs of the oxygen sensor and TIP sensor similarly, the controller may correct the output of the oxygen sensor to account for changes in the throttle inlet pressure during engine operation at 214.

Subsequently at 216, the controller may estimate the EGR flow based on the corrected oxygen sensor output. The controller may estimate the EGR concentration in the intake air based on a change in the corrected oxygen concentration estimated at 214 when the EGR valve is open and EGR is on (e.g. EGR valve 121) from a reference point where the EGR valve is closed and EGR is off. In other words, based on the change (e.g., decrease) in oxygen concentration determined when EGR is operating, to a time of operation with no EGR, the controller may estimate the EGR flow. Hydrocarbons from the EGR gas may dilute the intake air such that the oxygen concentration is reduced. Thus the change in the oxygen concentration registered by the oxygen sensor may be directly related to the EGR flow when the engine is not boosted. In other embodiments, the method at 216 may include estimating the EGR flow using an alternate method using the corrected output of the intake oxygen sensor.

Method 200 may then continue to 218 and the controller may adjust the EGR valve based on the EGR flow estimate from 216. In one embodiment, the controller may adjust engine operation by increasing or decreasing the amount of EGR by way of opening or closing the EGR valve to match the desired EGR flow rate. If the estimated EGR mass flow rate is less than the desired rate, then the controller may command the EGR valve to open further to allow for more EGR. On the other hand if the estimated EGR is higher than the desired EGR, the controller may command the EGR valve to close an amount thereby reducing the EGR flow. The desired rate may be determined based on engine operating parameters such as engine load, engine temperature, knock, etc.

Moving on to FIG. 3, a method 300 for diagnosing degradation of an oxygen sensor is shown. During boosted conditions, when one or more turbochargers (e.g., turbocharger 130) provide compressed air to the engine, the TIP may increase. Significant increases in the TIP may affect signal outputs of an oxygen sensor (e.g. IAO2 168 shown in FIG. 1). Although the oxygen sensor may not be used during boosted engine conditions to estimate an EGR flow, outputs from the oxygen sensor may still be taken and recorded in the memory of the controller (e.g. controller 12). Signals from a properly functioning oxygen sensor may mirror fluctuations in the TIP such that there is a high correlation between the TIP and oxygen sensor signals. However, as the oxygen sensor becomes more degraded, it may take longer for oxygen sensor signal to reflect changes in the TIP. The delay of the output of the oxygen sensor in response to changes in TIP of the intake air may therefore be used to determine when the oxygen sensor is degraded. As described earlier with reference to FIG. 2, the oxygen sensor may be used to estimate the EGR flow. This means that as the oxygen sensor becomes more degraded, the accuracy of the EGR flow estimates using the oxygen sensor may become increasingly inaccurate. Thus, it may be especially helpful to know when the oxygen sensor is not functioning properly so that EGR flow may be estimated more accurately.

Method 300 begins at 302 and the controller estimates and/or measures engine operating conditions based on feedback from a plurality of sensors (e.g. sensors 165). Engine operating conditions may include: engine temperature, engine speed and load, intake mass air flow, manifold pressure, a position of the EGR valve (e.g. EGR valve 121).

Based on the engine operating conditions estimated at 302, the controller may obtain outputs from a TIP sensor (e.g., pressure sensor 172 shown in FIG. 1) and an oxygen sensor (e.g., IAO2 168 shown in FIG. 1) at 304. The output of the TIP sensor may be a pressure, and the output of the oxygen sensor may be in the form of a pumping current which may be used to estimate an oxygen concentration in the intake air. Further, the outputs of the TIP sensor and the oxygen sensor may be time-varying outputs varying between maximum and minimum values. In one embodiment, the controller may constantly store outputs from the intake oxygen and TIP sensors within a memory of the controller. In another embodiment, the controller may obtain and store outputs from the TIP and oxygen sensors at a pre-determined rate. In another embodiment, the controller may obtain and store outputs from the oxygen and TIP sensors only during certain engine operating conditions (e.g. engine temperature below a threshold). Further, the controller may store the outputs of the sensors as a function of time, such that each sensor output may have a corresponding time at which it was taken.

The controller may then determine at 306 if the change of the TIP, as measured by the TIP sensor, is greater than a threshold. If the fluctuation in the TIP (e.g., fluctuation is the time-varying signal) is less than the threshold, then the controller may proceed to 308 and wait to perform a diagnosis on the oxygen sensor. As such, the controller may continue to cycle back to 306 until the fluctuation in the TIP is greater than the threshold. In one example, the threshold at 306 may be a threshold difference between local minimum and maximum values of the pressure waveform output from the TIP sensor. The output from the TIP sensor may vary over time due to boosting from the turbocharger (e.g. turbocharger 130) and/or changes in intake pressure, as described in more detail in FIG. 4. Thus, the pressure signal from the TIP sensor may deviate from a baseline first pressure level when the engine is not boosted to a higher second pressure level when the engine is boosted. The amount of increase from first to second pressure level may be determined by the amount of boost provided by the turbocharger. The threshold may be a predetermined pressure change in pressure. The threshold may be based on a TIP change large enough to cause a change in the oxygen sensor signal, where the oxygen sensor signal is the output of the oxygen sensor that may be used to infer an oxygen concentration. In other words, the threshold, may be a threshold difference between minimum and maximum pressure values from the TIP sensor. In another example, the threshold at 306 may be a threshold rate of change between TIP measurements. Thus, the threshold may be a threshold difference between TIP measurements over a set time interval where the set time interval may be pre-determined during vehicle manufacture. The set time interval may be an amount of time, a duration of engine use, a number of engine cycles, etc. Thus, if the TIP as measured by the TIP sensor changes by more than the threshold amount, then the controller may proceed to 310 and determine time constants of the intake oxygen and TIP signals output by the intake oxygen sensor and TIP sensor.

The time constants may be related to signal delays of the oxygen and TIP sensors to register fluctuations in pressure and oxygen concentration of intake air. As an example, if boost is enabled and one or more turbochargers start compressing intake air, it may take an amount of time before the TIP sensor registers the change in TIP. The delay in the sensor measurements in response changes in pressure and oxygen concentration may be used to compute time constants for each sensor. As explained above, the TIP may fluctuate over time, especially during episodes when boost is enabled. The TIP may increase from a baseline minimum TIP when boost is off to a maximum level during each boost cycle. Large fluctuations in the TIP may affect the output of the oxygen sensor. Specifically, the oxygen sensor signal may increase when the TIP increases by more than a threshold amount. In one example, the TIP difference threshold may be pre-set. Oxygen sensor output signals may mirror fluctuations in the TIP. In other words, for a non-degraded oxygen sensor, the time-varying signal output of the oxygen sensor may be highly correlated to the time-varying signal output of the TIP sensor. Thus, enabling boost may simultaneously and similarly affect the signals of both the TIP and oxygen sensors. The time constant may be the time interval between a proportion of the total change in oxygen and pressure signals. The difference between the minimum, and maximum signals from the oxygen and TIP sensors may be a total amount of change in their respective signals over a single boost cycle. The time constant may be the time elapsed during the increase from the minimum signal to a proportion (e.g. 63%) of the maximum signal of the sensor. In other words, the time constant may be the time interval over which approximately 63% of the total sensor signal change occurs in a given boost cycle. In another example the time constant may be defined by a proportion of the total increase other than 63%. Thus, once the controller has determined that fluctuation in the sensor signal has reached a maximum value, it may then determine the oxygen and/or pressure levels that define the time constant. In other words it may determine the sensor signal at which approximately 63% of the total increase in sensor signal occurred. Subsequently, the controller may retrieve the corresponding time points stored in the memory of the controller and compute the time constant based on the amount of time elapsed between the two time points. In one embodiment, the controller may continually update the time constants for the sensors by estimating the time constant for every fluctuation in the signals of the TIP and oxygen sensors. In another embodiment, the controller may store signal outputs from both sensors and their corresponding time points over a period of time and then retrieve those stored values to compute the time constants if the TIP changes by more than a threshold amount. For example, the time constants may be updated each drive cycle.

Returning to method 300, once the controller has determined the time constants for the oxygen and TIP signals, the controller may proceed to 312 and determine if the difference between the time constants is greater than a threshold. In this way, the time constant of each of the TIP and intake oxygen sensor outputs may be compared to one another. In one example, the threshold difference may be based on a difference at which the correlation between the TIP and intake oxygen sensor degrades such that the TIP correction (described at 214 in FIG. 2) results in an intake oxygen reading of reduced accuracy. In another example, the threshold difference may be based on the point where the actual EGR is different from the measured (e.g., calculated) EGR by more than a calibrated value. For example, the calibrated threshold could be where there is degraded EGR control, engine misfire, or emission related performance degradation. As described earlier, over time the oxygen sensor may become degraded. One possible type of degradation may include a decrease in response time of the oxygen sensor. As such, when degraded in this way, the time constant of the oxygen sensor may increase. In other words, it may take longer for the oxygen sensor to register fluctuations in the oxygen concentration of intake air. Thus, the time constant of the oxygen sensor may become larger than the TIP sensor time constant. As a result, the correlation between the TIP and intake oxygen signals for applying the TIP correction to the intake oxygen sensor output may degrade, thereby resulting in EGR flow estimates with reduced accuracy. Therefore, the time constant of the oxygen sensor being larger than the time constant of the TIP sensor by more than the threshold may be an indication of oxygen sensor degradation. If the difference between the two time constants is less than the threshold, then the controller may continue oxygen sensor operation at 314. Specifically, the oxygen sensor may be used to estimate an EGR flow as described in FIG. 2. However, if the difference between the time constant of the oxygen and TIP sensors is greater than the threshold at 312, method 300 may proceed to 316 and the controller may indicate degradation of the oxygen sensor. Indicating oxygen sensor degradation may involve notifying a vehicle operator (e.g. vehicle operator 190) via audible or visible signals including but not limited to an alarm and/or dashboard light. Indicating degradation at 316 may also include setting one or more diagnostic codes.

Method 300 may then continue to 318 and the controller may estimate EGR flow using an alternate method to the oxygen sensor. As described in FIG. 2, an alternate method for EGR flow may include using a DPOV sensor to estimate the EGR flow. Thus, if it is determined that the oxygen sensor is degraded in method 300, then the controller may determine that the conditions for EGR flow estimation with the oxygen sensor are not met. Therefore, the level of degradation of the oxygen sensor may affect whether or not the oxygen sensor is used to estimate the EGR flow in method 200. Specifically, at 208 in method 200, one of the conditions that must be met for EGR flow estimation with the oxygen sensor is that the difference between the oxygen sensor time constant and the TIP sensor time constant must be below a threshold. Thus, method 300 may be incorporated into 208 in method 200.

In this way, a method may include indicating degradation of an intake oxygen sensor based on a first time constant of an output of the intake oxygen sensor and a second time constant of an output of a throttle inlet pressure sensor. The throttle inlet pressure sensor may be disposed in an engine air intake system directly upstream of an intake throttle and wherein the intake oxygen sensor is positioned in the engine air intake system upstream of the throttle inlet pressure sensor. The method further comprises diagnosing the intake oxygen sensor in response to the output of the throttle inlet pressure sensor changing by a threshold amount over a duration, wherein the diagnosing includes indicating degradation of the intake oxygen sensor in response to a difference between the first time constant and the second time constant being greater than a threshold difference. Indicating degradation of the intake oxygen sensor includes one or more of setting a diagnostic flag and alerting a vehicle operator via a visual or audible signal that the intake oxygen sensor is degraded. The method further comprises, responsive to the indicating degradation of the intake oxygen sensor, not estimating an exhaust gas recirculation flow (EGR) based on the output of the intake oxygen sensor. The method further comprises responsive to the indicating degradation of the intake oxygen sensor, estimating the EGR flow based on a pressure difference across an EGR valve disposed in an EGR passage, the EGR passage positioned between an exhaust passage and an intake passage upstream of the intake oxygen sensor. The method further comprises in response to a difference between the first time constant and the second time constant being less than a threshold difference, adjusting the output of the intake oxygen sensor based on the output of the throttle inlet pressure sensor. The method further comprises adjusting an EGR valve based on the adjusted output of the intake oxygen sensor.

In another embodiment, a method may comprise when a change in an inlet pressure at an intake throttle is greater than a threshold amount, diagnosing an intake oxygen sensor based on a difference between a first time constant of a signal output by the intake oxygen sensor and a second time constant of a signal output by a throttle inlet pressure sensor. The diagnosing includes indicating degradation of the intake oxygen sensor in response to the difference between the first time constant and the second time constant being greater than a threshold difference, wherein indicating degradation includes one or more of setting a diagnostic code and alerting a vehicle operator. The method further comprises in response to the indicating degradation, adjusting a position of an EGR valve based on an output based on an alternate EGR flow estimate and not based on an output of the intake oxygen sensor. The change in the inlet pressure of the intake throttle includes an average difference between a maximum and minimum value of a pressure waveform output by the throttle inlet pressure sensor over a duration. The diagnosing includes not indicating degradation of the intake oxygen sensor in response to the difference between the first time constant and the second time constant being less than a threshold difference, subsequently correcting an output of the intake oxygen sensor based on an output of the throttle inlet pressure sensor, and adjusting an EGR valve based on the corrected output of the intake oxygen sensor. Correcting the output of the intake oxygen sensor includes correcting the output of the intake oxygen sensor based on a current output of the throttle inlet pressure sensor and a reference intake oxygen sensor output at a reference throttle inlet pressure. The first time constant is a first time constant of a time-varying signal output by the intake oxygen sensor and wherein the second time constant is a second time constant of a time-varying signal output by the throttle inlet pressure sensor. The method of claim 9, wherein the diagnosing is performed in response to a difference between a maximum and minimum value of a time-varying signal of the throttle inlet pressure sensor being greater than a threshold difference.

Turning to FIG. 4, a graph 400 depicts how the time constants of the oxygen sensor (e.g., IAO2 168 shown in FIG. 1) and TIP sensor (e.g., pressure sensor 172 shown in FIG. 1) may change over time. Graph 400 shows changes in the throttle inlet pressure (TIP) at plot 402, changes in the oxygen concentration of inlet air at plot 404, and changes in the time constants of the oxygen sensor and TIP sensor at plot 406. The oxygen concentration may be estimated based on outputs of the oxygen sensor, as described earlier with reference to FIG. 1, the TIP may be measured by the TIP sensor, and the time constants may be calculated, as described in FIG. 3. For example, the time constants may be approximately 63% of the final (e.g., maximum) value of the time-varying response of the TIP sensor and intake oxygen sensor. Specifically, the oxygen concentration may be estimated based on an output of the oxygen sensor in the form of a pumping current generated by an applied reference voltage. The TIP may be directly related to the output of the TIP sensor. As seen in plots 402 and 404, the oxygen concentration and TIP may fluctuate over time due to changing engine operating conditions (e.g. boosting, EGR flow, PCV and/or purge flow, etc.) and as depicted there are three fluctuations starting at times $t_1$, $t_3$, and $t_6$. In one example, the pressure fluctuations may be the result of changes in engine boosting. During said pressure fluctuations, the oxygen sensor may continue operation such that the outputs of the oxygen sensor may be used to infer an oxygen concentration, but the oxygen sensor may not be used to estimate an EGR flow if boost is on, as described with reference to FIG. 2. In other examples, the EGR flow may be estimated based on the intake oxygen sensor output, even if boost is on. With reference to FIG. 3, the time constants for both the oxygen concentration and TIP may be the time interval over which a pre-determined portion of each fluctuation occurs. The time constant as depicted in graph 400, is the time interval over which roughly 63% of the total increase in each fluctuation occurs. However, the time constant may be defined by other percentages of the total increase in pressure and oxygen concentration than that depicted in graph 400 (e.g. 50%) which may be pre-set. Regardless of what percentage of total increase in the sensor signal is used to define the time constant, the same percentage is used for the time constants of both the oxygen and TIP sensors. Plot 406 shows the difference between the oxygen sensor and TIP sensor time constants. As described with reference to FIG. 3, the time constants may be determined by a controller (e.g. controller 12) and compared to one another only when the fluctuation in TIP is greater than a threshold. Thus, in one example, the time constant may not continuously be estimated and compared during engine operation.

Starting before time $t_1$, throttle inlet pressure and oxygen concentration undulate around lower first levels, $P_1$ and $O_1$, respectively. Thus, the fluctuations in oxygen concentration in TIP may be below a threshold such that the controller may not be comparing the time constants of the oxygen and TIP sensors before $t_1$ as seen at plot 406 before $t_1$. Between $t_1$ and time $t_2$, the TIP may increase from the lower first level $P_1$ to an intermediate second level $P_2$. Correspondingly, the oxygen concentration may increase from the lower first level $O_1$ to an intermediate second level $O_2$. However the change in both TIP and oxygen concentration may remain below a threshold such that the controller does not estimate the difference between the time constants for the oxygen concentration and the TIP between $t_1$ and $t_2$.

From $t_2$ to time $t_3$, the TIP and oxygen concentration may undulate around $P_1$ and $O_1$ respectively, similarly to before $t_1$. Thus, the changes in both TIP and oxygen concentration may be small and relatively negligible such that the controller may not estimate the difference between the time constants for the oxygen and TIP sensors between $t_2$ and $t_3$. Between $t_3$ and time $t_5$ the throttle inlet pressure may increase from the lower first level $P_1$ to a higher third level $P_3$. Concurrently, the oxygen concentration may increase from the lower first level $O_1$ to a higher third level $O_3$. The increase in the TIP in the time interval between $t_3$ and $t_5$ may be greater than a threshold, and thus the controller may estimate and then compare the time constants for both the oxygen sensor and the TIP sensor. As can be seen in plots 402 and 404, the total increase in both oxygen concentration and pressure (between their base and peak levels) occurs between $t_3$ and $t_5$. Similarly, roughly 63% of the total increase in both pressure and oxygen concentration occurs in the same time interval between $t_3$ and time $t_4$. Thus, the time constants for both the oxygen concentration and TIP may be relatively the same. Consequently, as seen at plot 406 between $t_3$ and $t_4$, the difference between the oxygen sensor and TIP sensor time constants is at a lower first level $D_1$. In one example $D_1$ may be approximately zero. In another example, $D_1$ may be slightly greater than zero, such that the time constants for the oxygen sensor and TIP sensor may still be relatively the same. $D_1$ may be below a threshold difference $T_1$. The threshold difference $T_1$ may be a threshold above which the controller may signal oxygen sensor degradation to a vehicle operator as described with reference to FIG. 3. Since $D_1$ is below the $T_1$, the controller may not signal that the oxygen sensor is degraded and as such may continue oxygen sensor operation. In one example, continuing oxygen sensor operation may include obtaining oxygen content outputs and using the outputs to determine EGR and/or additional engine operating parameters when selected conditions are met. After $t_5$, the TIP and oxygen concentration may return to lower levels $P_1$ and $O_1$ respectively, and continue to undulate around their respective lower levels until time $t_6$. As such the controller may not estimate the difference between the time constants of the oxygen and TIP sensors between $t_5$ and $t_6$.

At $t_6$, both the TIP and oxygen concentration may increase from lower first levels $P_1$ and $O_1$, respectively. The TIP may increase to $P_3$, and as such the controller may compare the time constants of the TIP and oxygen sensors just as at $t_3$. However, unlike at $t_3$ where the time constants of the oxygen and TIP sensor were relatively the same, the time constant of the oxygen sensor may be greater than the time constant of the TIP sensor at $t_6$. In other words, the oxygen sensor signal may be slower to register a change in the oxygen concentration than the TIP sensor is to register a change in the TIP. From $t_6$ to $t_8$, the TIP may increase from the lower first level $P_1$ to the higher third level $P_3$. Time $t_8$ represents the time at which the TIP reaches its maximum value $P_3$. Time $t_7$ represent the time at which the TIP reaches 63% of its total increase. Thus, the time interval from $t_6$ to $t_7$ represents the time constant for the TIP sensor. For the oxygen concentration, time $t_{10}$ represents the time at which the oxygen concentration reaches its maximum third value $O_3$. Time $t_9$ represent the time at which the oxygen concentration reaches approximately 63% of its total increase from $O_1$ to $O_3$. Thus, the time interval between $t_6$ and $t_9$ represents the time constant for the oxygen sensor. As seen after $t_6$ the oxygen sensor is slower to register a change in oxygen concentration than the TIP sensor is to register the change in TIP. As such, the time constant for the oxygen sensor is not the same as the time constant for the TIP sensor. This is reflected in the difference between the two time constant in plot 406. The difference between the time constants for the oxygen sensor and the TIP sensor is at a second level $D_2$ which is greater than the threshold difference $T_1$. Because the oxygen sensor is delayed in registering the change in oxygen concentration, the controller may signal to a vehicle operator that the oxygen sensor is degraded as described with reference to FIG. 3.

Thus, FIG. 4 shows an example of when the controller may estimate time constants for the oxygen and TIP sensors, and how the difference between the two time constants may be used to determine oxygen sensor degradation. When the TIP changes by more than a threshold amount, the controller may estimate time constant for both the oxygen sensor and TIP sensor. If the difference between the time constants is greater than a threshold amount, then the controller may signal to a vehicle operator that the oxygen sensor is degraded.

In this way, the systems and methods described herein may provide a method for detecting oxygen sensor degradation. Specifically, when the throttle inlet pressure fluctuates by more than a threshold amount, time constants for an oxygen sensor and a TIP sensor may be estimated. The time constants may be time constants of the time-varying waveforms output by the sensors. In other words the time constant may be related to the response time for each sensor to detect changes in the TIP and oxygen concentration of intake air. As the oxygen sensor becomes degraded over use, it may become slower to register changes in the oxygen measured at the sensor and as a result, the time constant of the oxygen sensor response signal may increase. Thus, the time constant of the oxygen sensor may be used as a measure of oxygen sensor degradation. If the difference between the time constant of the oxygen sensor and the TIP sensor becomes greater than a threshold amount, the controller may determine that the oxygen sensor is degraded.

Thus, a technical effect of determining and subsequently indicating when the intake oxygen sensor is degraded is achieved by comparing the time constant of the oxygen sensor to the time constant of the TIP sensor. In doing so, the vehicle operator may be notified as to when it is necessary to replace and/or repair the oxygen sensor. The oxygen sensor may be used to estimate an EGR flow by comparing oxygen concentration levels when EGR is flowing to a reference zero point when EGR is off. Outputs from a faulty oxygen sensor may have reduced accuracy, and as such the accuracy of the EGR flow estimates using the oxygen sensor may be reduced. Thus, another technical effect is achieved by avoiding estimating EGR flow with the oxygen sensor once it has become degraded. Doing so may increase the accuracy of EGR flow estimates when the oxygen sensor has become degraded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting exhaust gas recirculation (EGR) flow based on a first output of an intake oxygen sensor in response to a difference between a first time constant of the first output and a second time constant of a second output of a throttle inlet pressure sensor being less than a threshold; and
adjusting the EGR flow based on an alternate sensor output in response to the difference being greater than the threshold.

2. The method of claim 1, wherein adjusting the EGR flow based on the alternate sensor output includes not adjusting the EGR flow based on the first output of the intake oxygen sensor in response to the difference being greater than the threshold.

3. The method of claim 1, wherein adjusting the EGR flow based on the alternate sensor output includes adjusting the EGR flow based on a third output of a differential pressure over valve (DPOV) sensor positioned around an EGR valve disposed in an EGR passage coupled between an exhaust passage, downstream of a turbine, and an intake passage, upstream of a compressor, where the DPOV sensor detects a pressure difference between an upstream region of the EGR valve and a downstream region of the EGR valve.

4. The method of claim 1, wherein adjusting the EGR flow includes adjusting an amount of EGR flow delivered to an intake passage, upstream of a compressor, via adjusting a position of an EGR valve disposed in an EGR passage coupled between an exhaust passage, downstream of a turbine, and an intake passage, upstream of the compressor.

5. The method of claim 1, wherein the throttle inlet pressure sensor is disposed in an engine air intake system directly upstream of an intake throttle and wherein the intake oxygen sensor is positioned in the engine air intake system upstream of the throttle inlet pressure sensor.

6. The method of claim 1, further comprising indicating degradation of the intake oxygen sensor based on the first time constant and the second time constant.

7. The method of claim 6, further comprising diagnosing the intake oxygen sensor in response to the output of the throttle inlet pressure sensor changing by a threshold amount over a duration, wherein the diagnosing includes indicating degradation of the intake oxygen sensor in response to the difference between the first time constant and the second time constant being greater than the threshold.

8. The method of claim 6, wherein indicating degradation of the intake oxygen sensor includes one or more of setting a diagnostic flag and alerting a vehicle operator via a visual or audible signal that the intake oxygen sensor is degraded.

9. The method of claim 1, further comprising in response to the difference between the first time constant and the second time constant being less than the threshold, adjusting the first output of the intake oxygen sensor based on the second output of the throttle inlet pressure sensor and adjusting EGR flow based on the adjusted first output of the intake oxygen sensor.

10. A method, comprising:
during a first condition, correcting an output of an intake oxygen sensor based on an output of a throttle inlet pressure sensor and adjusting an amount of low-pressure exhaust gas recirculation (EGR) flow based on the corrected output of the intake oxygen sensor; and
during a second condition, adjusting the amount of low-pressure EGR flow based on a pressure difference across an EGR valve disposed in a low-pressure EGR passage positioned between an exhaust passage and intake passage upstream of the intake oxygen sensor.

11. The method of claim 10, wherein the pressure difference across the EGR valve is estimated via a differential pressure over valve sensor positioned around the EGR valve.

12. The method of claim 10, wherein the first condition includes when a difference between a first time constant of the output of the intake oxygen sensor and a second time constant of the output of the throttle inlet pressure sensor is less than a threshold difference.

13. The method of claim 12, wherein the first time constant is a first time constant of a time-varying signal output by the intake oxygen sensor and wherein the second time constant is a second time constant of a time-varying signal output by the throttle inlet pressure sensor.

14. The method of claim 10, wherein the second condition includes when a difference between a first time constant of the output of the intake oxygen sensor and a second time constant of the output of the throttle inlet pressure sensor is greater than a threshold difference.

15. The method of claim 10, further comprising when a change in an inlet pressure at an intake throttle is greater than a threshold amount, diagnosing the intake oxygen sensor based on a difference between a first time constant of a signal output by the intake oxygen sensor and a second time constant of a signal output by the throttle inlet pressure sensor and wherein the diagnosing includes indicating degradation of the intake oxygen sensor in response to the difference between the first time constant and the second time constant being greater than a threshold difference, wherein indicating degradation includes one or more of setting a diagnostic code and alerting a vehicle operator.

16. The method of claim 15, wherein the change in the inlet pressure of the intake throttle includes an average difference between a maximum and minimum value of a pressure waveform output by the throttle inlet pressure sensor over a duration.

17. The method of claim 16, wherein the diagnosing is performed in response to a difference between a maximum and minimum value of a time-varying signal of the throttle inlet pressure sensor being greater than a threshold difference.

18. The method of claim 10, wherein correcting the output of the intake oxygen sensor includes correcting the output of the intake oxygen sensor based on a current output of the throttle inlet pressure sensor and a reference intake oxygen sensor output at a reference throttle inlet pressure.

19. A system, comprising:
an air intake system of an engine including an intake throttle;
a throttle inlet pressure sensor disposed in the air intake system upstream of the intake throttle;
an intake oxygen sensor disposed in the air intake system upstream of the throttle inlet pressure sensor;
an exhaust gas recirculation (EGR) passage coupled between an exhaust passage and an intake passage of the air intake system upstream of the intake oxygen sensor, the EGR passage including an EGR valve with a differential pressure over valve (DPOV) sensor; and
a controller with computer readable instructions for:
adjusting a position of the EGR valve based on a corrected output of the intake oxygen sensor, the corrected output corrected based on an output of the throttle inlet pressure sensor, in response to a difference between a first time constant of a signal output by the intake oxygen sensor and a second time constant of a signal output by the throttle inlet pressure sensor being less than a threshold difference when the signal of the throttle inlet pressure sensor is fluctuating by a threshold amount; and
adjusting the position of the EGR valve based on an output of the DPOV sensor and not the intake oxygen sensor in response to the difference between the first time constant and the second time constant being greater than the threshold difference.

20. The system of claim 19, wherein when the signal of the throttle inlet pressure sensor is fluctuating by the threshold amount includes when an average change in the signal of throttle inlet pressure is greater than the threshold amount over a duration.

* * * * *